United States Patent [19]

Ganssle

[11] 4,355,775
[45] Oct. 26, 1982

[54] SPACECRAFT SEPARATION APPARATUS

[75] Inventor: Eugene R. Ganssle, Skillman, N.J.

[73] Assignee: RCA Corporation, New York, N.Y.

[21] Appl. No.: 86,796

[22] Filed: Oct. 22, 1979

[51] Int. Cl.³ .............................................. B64G 1/64
[52] U.S. Cl. ................................. 244/158 R; 244/161
[58] Field of Search ............... 244/158, 161, 169, 172, 244/137 R; 89/1.5 R, 1.5 H, 1.5 G, 1.5 F

[56] References Cited

U.S. PATENT DOCUMENTS

| | | | |
|---|---|---|---|
| 2,858,737 | 11/1958 | Tolomeo | 89/1.5 R |
| 3,116,895 | 1/1964 | Mitchum | 244/158 |
| 3,547,375 | 12/1970 | Mackey | 244/158 |
| 3,799,478 | 3/1974 | Costes et al. | 244/137 R |

*Primary Examiner*—Charles E. Frankfort
*Attorney, Agent, or Firm*—Samuel Cohen; William Squire

[57] ABSTRACT

A spacecraft is secured to a reusable cradle mounted in a space shuttle cargo bay. It is launched from the shuttle by separation apparatus secured to the cradle, which apparatus imparts forces in the same direction to three spaced points on the spacecraft such that a line passing through the center of gravity of the spacecraft, extending in the direction of application of the forces, passes through the triangle formed by lines joining these three points. The apparatus includes a plurality of interconnected spring loaded push rods which propel the spacecraft equal distances in the same direction and time interval, thereby precluding any rotation.

8 Claims, 12 Drawing Figures

SPACECRAFT SEPARATION APPARATUS

The U.S. government has rights in the present invention in accordance with Contract No. F04701-78-C-0016 awarded by the Department of the Air Force.

The present invention relates to apparatus for separating a spacecraft from a support vehicle, in space.

The final stage of a launch vehicle is equipped with apparatus for separating from it the spacecraft carried by the vehicle. Such apparatus imparts an accelerating force and may be used for spacecraft which it is desired to launch without a spinning force component.

There is currently under development a space shuttle, which is a reusable support vehicle for launching spacecraft and which returns to earth upon completion of the launch. The interior of the shuttle, that is, the cargo bay, contains a number of reusable cradles, each supporting a spacecraft. The cradles may be in alignment and the spacecraft may be launched independently of one another. Due to space limitations, the spacecraft are nested within their respective cradles.

The shuttle has cargo doors which open during the spacecraft launching interval. Each spacecraft is in close proximity to its cradle, to the adjacent cradles and spacecraft, and to other structures, that is, there is little clearance between a spacecraft and the surrounding structures.

A spacecraft may be made ready for launching by transferring it from the cargo bay to an exterior position by means of a remote manipulator system. This is relatively complex and costly and adds additional structure to the launch vehicle which reduces its payload capacity.

In a spacecraft separating arrangement embodying the present invention, means are provided for applying at least three spaced forces to the spacecraft, in the same direction away from the support means of the launch vehicle. The forces are applied to spaced points on the spacecraft. Straight lines joining these points define an area intersected by a line parallel to the direction of application of the forces which passes through the center of gravity of the spacecraft.

Figure 1:
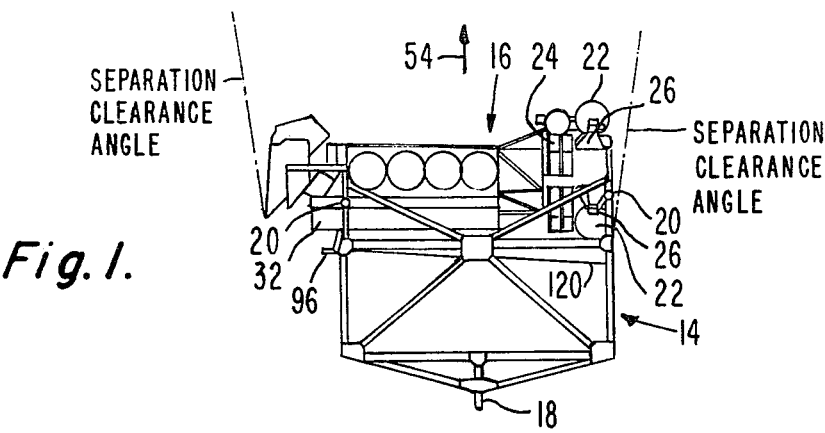
FIG. 1 is a side elevational view of a spacecraft support and separation apparatus embodying the present invention.
Figure 5:
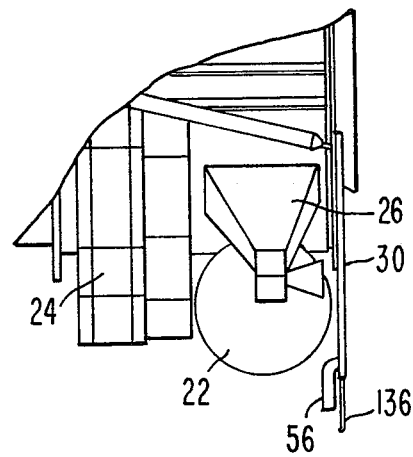
Figure 4:
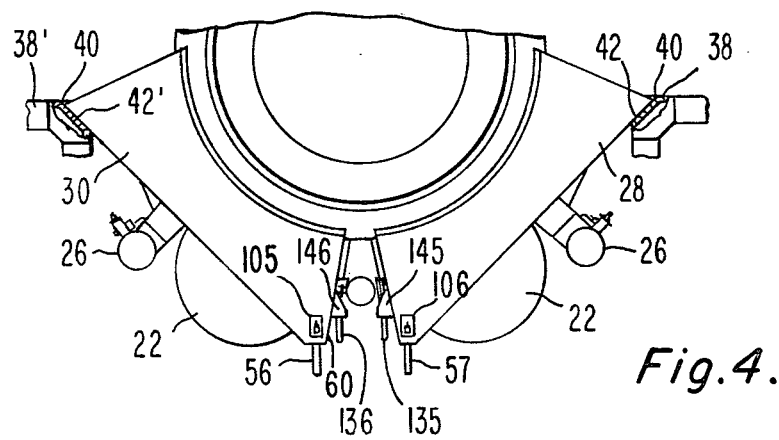
Figure 3:
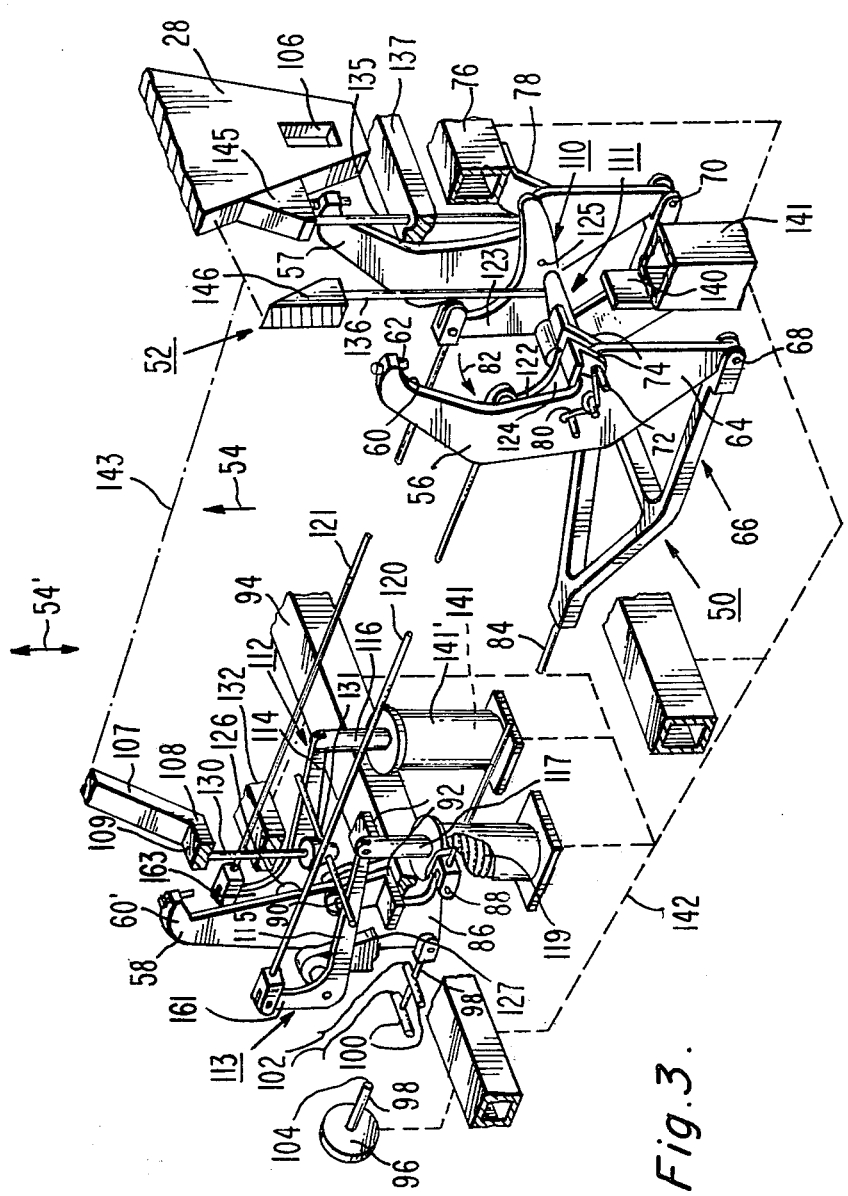
FIG. 3 is an isometric view illustrating in more detail, a cam and link structure which restrains and separates the spacecraft of FIGS. 1 and 2 from its support cradle structure.
Figure 6:
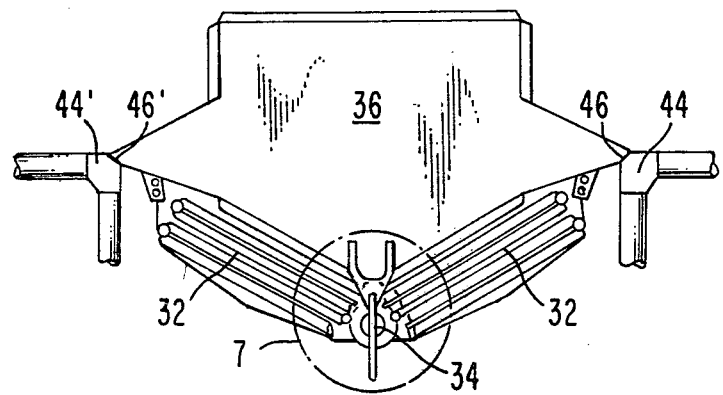
Figure 7:
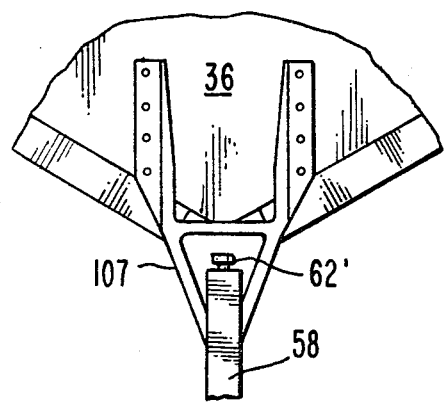
Figure 8:
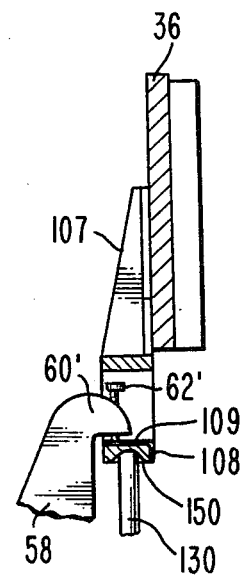
Figure 9:
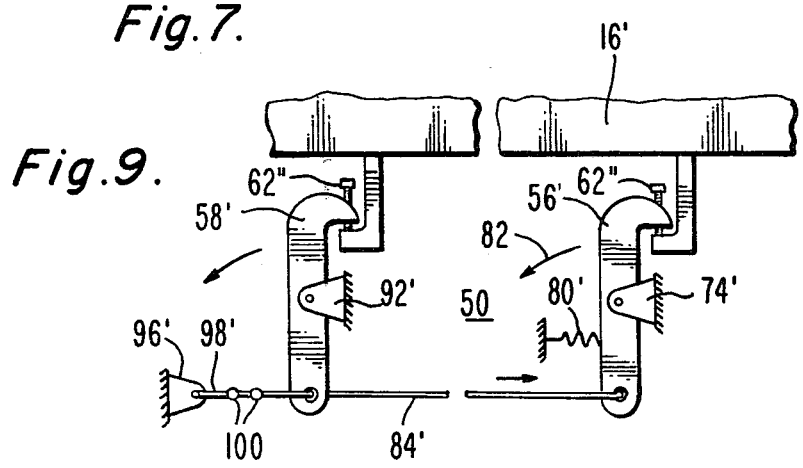
Figure 10:
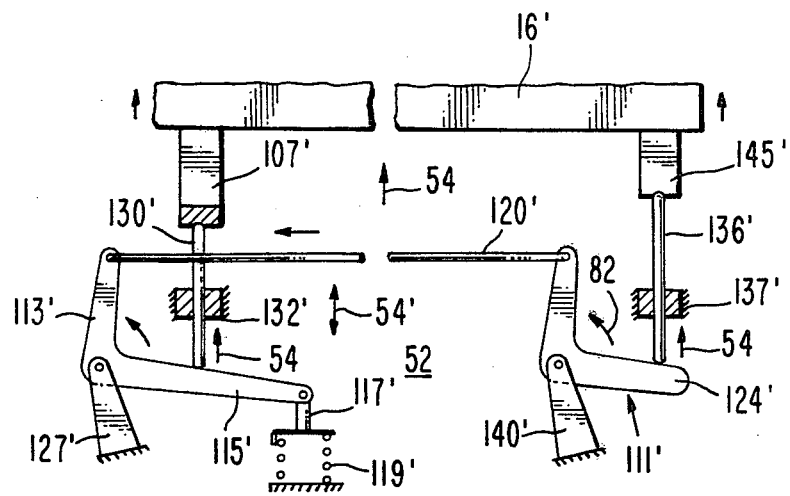
Figure 11:
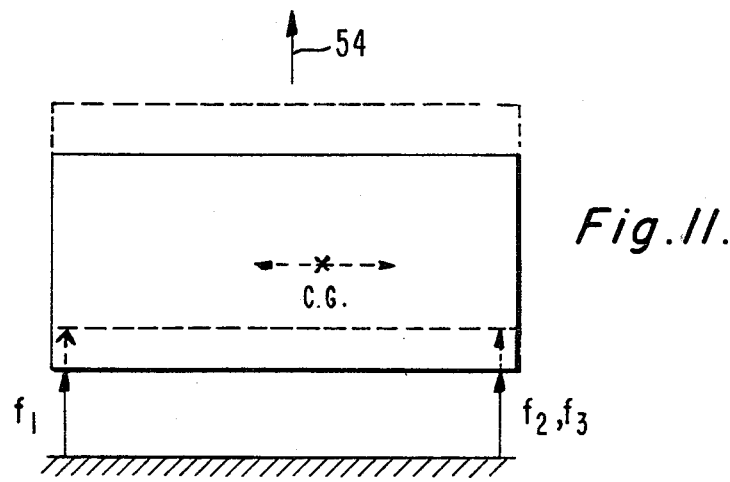
Figure 12:
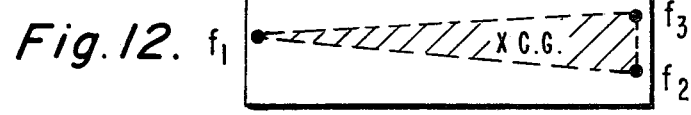

FIG. 4 is a partial rear elevation view of the portion of the spacecraft of FIG. 1 showing the connection of a portion of the mechanism of FIG. 3, FIG. 5 is a side elevation view of the spacecraft portion of FIG. 4, FIG. 6 is a front elevation view of the spacecraft and support structure of FIG. 1, FIG. 7 is an end partial elevation view of a portion of FIG. 6 in more detail within the broken circle 7, FIG. 8 is a side elevational view of the view of FIG. 7, FIG. 9 is a diagrammatic elevation view illustrating the release mechanism of the apparatus of FIG. 3, FIG. 10 is a diagrammatic elevation view illustrating the separation mechanism of the apparatus of FIG. 3, and FIGS. 11 and 12 are force diagrams useful in illustrating the principles of the present invention.

Figure 2:
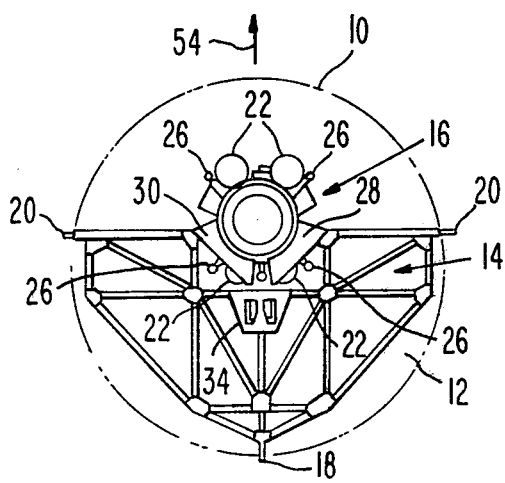
FIG. 2 is a rear elevation view of the apparatus of FIG. 1.

In FIG. 2 broken line 10 represents the interior wall of a reusable spacecraft launch vehicle or shuttle. Mounted within its cargo bay 12 is a spacecraft cradle or support structure 14 comprising a truss network of interconnected frame elements.

A centrally positioned keel post 18 extends vertically downward from the support structure. Trunnions which extend horizontally outwardly from the four corners of the structure 14 are mounted within suitable receptacles in the bay of the shuttle. The locations of the trunnions 20 and the keel 18 are determined by the design of the shuttle. In practice, the shuttle may contain a number of cradles such as 14 arranged in a linear array extending into the drawing in FIG. 2. The design of the support structures 14 may be different for different spacecraft and for different manufacturers.

In use, the shuttle is initially loaded with support structure and spacecraft of whatever design is chosen for a particular mission. The shuttle is launched into space and then the spacecraft are launched from the shuttle. Then the shuttle and its cradles return to the earth. In the future it is contemplated that most spacecraft placed in space will be launched in this manner.

Spacecraft 16 is an elongated structure with its long axis extending into the drawing of FIG. 2 and left to right of the drawing, FIG. 1. The spacecraft may include a number of tank structures 22, batteries 24, and thrusters 26, as shown. Mounted to the rear of the spacecraft are a pair of bulkhead plates 28 and 30. Mounted to the front end of the spacecraft is bulkhead plate 36, FIG. 6. Mounted on the underside of the spacecraft is a folded array of solar cells 32, as best seen in FIG. 6. A boom 34 for supporting the array of cells in the extended position is stowed beneath the spacecraft along the lowermost central portion. This spacecraft may be any one of many different kinds which may be mounted on support structure 14. The mass center (center of gravity) for these different spacecraft may differ from each other.

As shown in FIG. 4, the support structure 14 has support fittings 38 and 38' at the rear of the spacecraft for supporting respectively the bulkhead plates 28 and 30 along their respective upper edges 42 and 42'. Referring to FIG. 6, fittings 44 and 44', at the front of the structure, receive edges 46 and 46', respectively, of bulkhead plate 36. The spacecraft rests in the grooves 40 of the fittings 38 and 38', FIG. 4, and grooves (not shown) in fittings 44 and 44'. The grooves provide support in a horizontal direction for the spacecraft in and out and left and right of the drawing of FIG. 2.

The spacecraft 16 has a number of irregular elements secured to it. Elements such as the thrusters 26 on the lower portion of the spacecraft and the lower tanks 22 are nested within the cradle structure 14. There is relatively little clearance between the structure 14 and these other elements secured to the lower portion of the spacecraft. In addition, as seen in FIG. 1, because a number of spacecraft may be launched from a common launch vehicle there is relatively little clearance between adjacent spacecraft. It is estimated that in order for the spacecraft to clear adjacent structures during its launch, it should separate from the cradle within an 8° clearance angle as shown by the broken lines of FIG. 1.

In FIG. 3, the spacecraft is restrained and secured to the support structure 14 represented by dashed line 142, by a restraining apparatus 50, which is shown in diagrammatic form in FIG. 9 to illustrate its operating principles. The restraining apparatus 50 is mounted on the support structure 14 and locks the spacecraft 16 represented by dashed line 143, FIG. 3, to the support structure until the spacecraft is ready to be launched from the shuttle. Upon release of the spacecraft from the shuttle 10 (FIG. 2) by operation of the restraining apparatus 50 it is necessary to eject the spacecraft from the support structure 14. When ejected, the spacecraft should clear the support structure and the shuttle without interference. To do so, separation apparatus 52, FIG. 3, whose principles of operation are illustrated schematically in FIG. 10, accelerates the spacecraft from the supporting structure 14 in a single direction 54 without rotating the spacecraft so that the spacecraft 16 clears the support structure 14 and any protruding elements of the shuttle 10 (FIG. 2). The same type of apparatus 50 and 52 can be used to restrain and launch many different spacecraft of different types from the support structure 14.

As can be observed from the drawing, a variety of irregular attachments to this particular spacecraft may result in the center of gravity of the spacecraft being off center. The center of gravity, shown as an x and designated C.G. in FIG. 2, may be located approximately centrally in the end view of the spacecraft in FIG. 2, but may be asymmetrically located along the axial length of the spacecraft as in FIGS. 11 and 12 which correspond to side and top views other spacecraft. Because of the many odd and irregular devices attached to different spacecraft which may be launched from the same support structure the center of gravity may vary from spacecraft to spacecraft along the length of the spacecraft. In view of the reusable nature of the support structure 14, it is designed to be able to separate spacecraft of different designs from the shuttle, using the same mechanical means and in such a way that regardless of the design, the spacecraft will clear the surrounding structures during separation. The spacecrafts are launched without significant rotation and regardless of the positions of the center of gravity.

A mechanical means is used to separate the spacecraft from the shuttle because it is impractical for the spacecraft to operate its primary engines and thrusters while within the shuttle's cargo bay. Such operation would produce heat which could damage or destroy adjacent craft, the shuttle and/or itself.

Apparatus 52 attached to the common support structure 14, to be described, applies forces $f_1$, $f_2$, $f_3$, FIGS. 11 and 12, to spaced points on the spacecraft 16. If lines are drawn joining these points, they form a triangle. The three planes containing these lines, which planes extend in the direction of application of the forces, form a triangular cylinder. So long as the center of gravity (C.G.) is within this cylinder (within the hatched area in FIG. 12) which includes being on the boundary itself (the dashed line in FIG. 12), and as long as those forces are in the same direction with components in no other direction, and are applied for the same time interval over the same displacement, then the spacecraft 16 will accelerate along a straight line path, without rotation. The design of the present equipment is such that regardless of the spacecraft design, its C.G. does fall within or on the border of the triangular cylinder described above, even though the C.G. position may differ in the different spacecraft designs.

When the spacecraft 16 is launched and accelerated in one direction 54 (this motion is termed "translation") parallel to the direction of the forces $f_1$, $f_2$ and $f_3$, the spacecraft 16 will clear the support structure 14 and the shuttle 10. Such translation occurs even if its C.G. is asymmetrically located within the triangular area of FIG. 12.

The restraining apparatus 50 of FIG. 3 comprises three bell cranks 56, 57 and 58. As all cranks have the same structure, only 56 will be described. It has a hook 60 at its upper end at which a screw 62 is attached for making adjustments as will be described. The lower arm 64 of crank 56 is pinned to the yoke 66 at 68. Crank 57 is pinned to yoke 66 at pivot 70. Crank 56 is pivotally mounted to the support structure 14 via pivot pin 72 and brackets 74. Brackets 74 are secured to the underside of square tubular truss member 76 of structure 14. The truss members are connected together at their ends by gusset members. The crank 57 is pivotally mounted to the underside of truss member 76 via brackets 78.

Torsion spring 80 biases the crank 56 in direction 82. The yoke 66 is connected by a connecting link 84 to lower arm 86 of crank 58. Link 84 and arm 86 are pinned at 88. Crank 58 is pivoted at 90 to brackets 92 which is mounted on the upper surface of truss member 94. Arm 86 is releasably attached to the support structure 14 member 96 via link 98. Mounted on the link 98 are a pair of pyrotechnic link cutting devices 100.

A signal applied to wires 102 connected to devices 100 causes an explosive charge in each device to fire and these actuate cutting devices which sever the link 98 as shown at 104. When the link 98 is severed, the torsion spring 80 rotates the bell crank 56 and the yoke 66 and thus all of the bell cranks 56, 57, 58 move in unison in the direction 82 to the positions illustrated in FIG. 3.

In the normal restrained position, the bell cranks 56-58 are in positions which are rotated clockwise in the direction opposite 82, with the link 98 integral in the unsevered condition. When the link 98 is in the unsevered condition and the bell cranks 56-58 are in the spacecraft locking position, the hooks 60 and more specifically, the screws 62 attached to the hooks 60 of each of the bell cranks, engage the spacecraft.

In its restrained position (FIG. 4), hook 60 of crank 56 engages the lower wall of the rectangular opening 105 in plate 30 while the hook of bell crank 57 engages the lower wall of opening 106 in plate 28. At the other end of the spacecraft (FIGS. 7 and 8) the hook 60' of crank 58 engages lower leg 108 of loop element 107 mounted to plate 36. The screw 62' abuts the leg 108 upper surface 109. Screws 62 of the remaining bell cranks are adjusted to abut the lower legs of the openings 105 and 106. The screws hold the spacecraft securely to the structure 14. In this manner the cranks 56-58 lock the spacecraft in place.

In the initial operation of the restraining apparatus in locking the spacecraft in place, the bell cranks 56-58 are rotated clockwise to the position shown schematically in FIG. 9. Crank 56' represents cranks 56 and 57 of FIG. 3 while crank 58' represents crank 58 of FIG. 3. Pivot support 74' corresponds to brackets 74 while support 92' corresponds to brackets 92 of FIG. 3, respectively. The link 84' connects the cranks 56' and 58' together and corresponds to link 84. Support 96' corresponds to support member 96 of FIG. 3. The spring 80' corresponds to torque spring 80 of FIG. 3. As can be seen, the spacecraft 16' is held down by the cranks 56' and 58'. The grooves in the support structure 14 as described previously restrain the spacecraft in the horizontal directions. Thus, the spacecraft 16' is securely locked in place.

An electrical signal is applied to the pyrotechnic devices 100. These devices, only one of which is required for cutting the link 84' and the other serving as a back up in case of failure of the first, sever the link 84'. Once the link is severed, the common spring 80' forces all three bell cranks, schematically represented by 56' and 58', in the direction 82 simultaneously freeing the spacecraft from each of the bell cranks 56' and 58'. This action permits the spacecraft to be separated.

While bell cranks are described in the present example, it will occur to those of ordinary skill that other restraining devices may be provided instead, for example, pyrotechtic devices attached to restraining bolts may be used.

The separation apparatus 52 of FIG. 3 comprises four bell cranks 110, 111, 112 and 113. Arms 114 and 115 of cranks 112, and 113, respectively, are connected, to links 116 and 117. Link 117 is coupled to coil spring 119. Link 116 is coupled to a similar coil spring 141 within casing 141'. Coil spring 119 is a compression spring which forces the link 117 generally in the direction 54 when released. Coil spring 141 acts similarly on link 116. The ends of arm 161 of crank 113 and arm 163 of crank 112 are pinned to one end of links 120 and 121, respectively. The other ends of links 120 and 121 are pinned to arms 122 and 123, respectively, of cranks 111 and 110.

Cranks 112 and 113 are pivotally mounted to bracket 127 via shaft 126. Bracket 127 is secured to truss member 94. Push rod 130 extends vertically upward from cross arm 131 which is cammed to the upper surfaces of lower arms 114 and 115 of cranks 112 and 113, respectively. A sleeve 132 engages the push rod 130 and guides push rod 130 so push rod 130 can reciprocate only in the directions 54' parallel to direction 54.

Push rods 135 and 136 are slideably received in a sleeve 137 secured to structure 14 so that they may reciprocate in directions 54' only. The lower end of rods 136 and 135 abut and are cammed against the upper surface of lower arms 124 and 125 of cranks 111 and 110, respectively. These cranks are pivotally mounted to bracket 140 which is secured to truss member 141. The lower dashed lines 142 indicate a link for the elements which are interconnected to the cradle or support structure 14 while the upper dashed line 143 indicates a link for the elements which form part of the spacecraft structure. The upper edge of push rod 135 engages and is seated in the lower concave surface of element 145 attached to plate 28 and the upper end surface of rod 136 engages and is seated in the lower concave surface of element 146 attached to plate 30. The upper end surface of push rod 130 engages and is seated in a concave seat 150, FIG. 8, on the lower surface of leg 108 of loop element 107. Concave seat 150 prevents the rod 130 from slipping during its operation.

Referring to FIG. 10 for a schematic pictorial representation of the connection of the links of FIG. 3 forming the separation apparatus 52, the primed numbers represent the unprimed numbers of FIG. 3. The lower crank arms of each of the cranks of FIG. 10 between the contact point of the push rods 130' and 136' and the pivot point of that bell crank are the same in length and orientation. While two push rods are illustrated in FIG. 10, these represent the three push rods illustrated in FIG. 3 operated by the four cranks as shown. The spacing of these push rods in plan view corresponds to the spacing of forces $f_1$, $f_2$ and $f_3$ of FIG. 12.

The upper crank arms of the bell cranks between link 120' (which represents links 120 and 121) and the pivot point of that bell crank are the same in length and orientation. The same is true for the dimensions of the actual crank arms of FIG. 3. The two bell cranks of FIG. 10 represent the four cranks of FIG. 3. The length of leg 115 between rod 130' and link 117' determines the acceleration rate and forces applied by the coil spring 119', which as discussed above represents the two springs 141 and 119 of FIG. 3. The sleeves 132' and 137' insure that rods 130' and 136', respectively, reciprocate in only the directions 54'. The lower surfaces of the push rods are cammed against the upper surfaces of the bell crank lower arms and may be slideably engaged or engaged with rollers, wheels, ball bearings, and the like in accordance with a given implementation. Coil spring 119' as shown is compressed under load.

At this time the hooks of cranks 56, 57 and 58 of FIG. 3 are engaged and restrain the spacecraft 16 under load against the cradle or support structure 14. The link 98 of FIG. 3 is intact. The upper surfaces of push rods 130' and 136' (FIG. 10) are engaged against the lower surfaces of elements 107' and 147'.

Upon the severence of the link 98 by the devices 100, the cranks 56, 57 and 58 rotate as described previously in direction 82 releasing the spacecraft 16'. The three push rods represented by 130' and 136' being under preload due to the two springs represented by 119' urge the spacecraft 16' in the vertically upward direction 54. Bell cranks 113' and 111' rotate in the direction 82 which is counterclockwise as shown in the drawing. This forces the push rods 130' and 136' upward as guided by the sleeves 132' and 137'.

The three push rods of FIG. 3 form a force prism as described above in connection with FIG. 12. Each push rod exerts a separate force, $f_1$, $f_2$, $f_3$, respectively. The sole force for all of the push rods comes from the springs 119 and 141. The interconnection of all of the push rod bell cranks are integral links. Thus the action of one push rod bell cranks is followed precisely by the action of the remaining push rod bell cranks. Thus, all push rods are acted upon in unison in the same direction due to their identical crank dimensions and orientations.

Spacecraft 16' is thus lifted off the cradle or support structure 14 by the action of push rods only in direction 54 and without rotation. This is true regardless of the position of the center of gravity of the spacecraft as long as a line parallel to the direction of application of the force which passes through the center of gravity lies within or on the dashed-line triangular boundary of FIG. 12.

While push rods have been illustrated in the present embodiment, it will occur to those of ordinary skill that other mechanisms connected together to provide uniform forces in the same direction and with the same acceleration may be utilized. For example, cams and cam followers operated by rotary mechanisms may be employed. Wedges or other sloping cam surface devices operated in reciprocating manner may be used in the alternative. The important criterion is that the camming action pushing the spacecraft away from the support structure operate in unison and displace with identical displacement in the same time interval.

What is claimed is:

1. A spacecraft separation apparatus comprising:
a support structure,
means for releasably securing said spacecraft to said structure, and
spacecraft separation and acceleration means secured to said structure comprising means for applying distributed separate forces in the same direction and during equal, simultaneous time intervals to said spacecraft at at least three spaced points in a direction away from said structure to accelerate said spacecraft in said direction, the lines joining said points forming a triangle, the area containing these lines extending in a direction parallel to the forces forming a triangular tube, the center of gravity of said spacecraft being located within said triangular tube, whereby upon release of said spacecraft by said means for securing, said spacecraft separates from said structure by translating in said direction without rotation.

2. The apparatus according to claim 1 wherein said means for applying forces includes a plurality of interconnected cam means, a separate cam means corresponding to each force of said forces, means for providing at least one force to the system forming said interconnected cam means so that said one force is translated into said distributed forces.

3. The apparatus according to claim 2 wherein said cam means each includes a bell crank having first and second arms, a first link member cammed to one arm of each crank at one end of the link member and abutting said spacecraft at the other end and including means for limiting translation motion of said first link member in a direction parallel to said direction, a second link member connecting the other arm of said cranks together so that said cranks operate in unison, said first link member of each cam means being oriented parallel to each other, and drive means for applying said at least one force to said system in a direction to force said second link in said equal direction.

4. The apparatus according to claim 3 wherein said drive means includes spring means coupled between said structure and an arm of at least one of said cranks.

5. The apparatus according to claim 1 wherein said means for releaseably securing includes retaining means moveably attached to said support structure and releaseably engaged with said spacecraft at at least one location.

6. The apparatus according to claim 5 wherein said retaining means includes a plurality of spaced bell cranks, each crank having a leg on one arm thereof adapted to engage said spacecraft, link means for operating said bell cranks in unison, and drive means for providing a torque on at least one of said bell cranks.

7. In a spacecraft structure including spacecraft support means to which the spacecraft is releaseably secured, the combination therewith comprising:
means for applying at least three spaced forces to said spacecraft in the same direction away from said support means at at least three spaced points, each of said forces being directed solely in said same direction, lines joining spaced points forming a geometric figure, the planes containing these lines extending in a direction parallel to said forces forming a tube having a cross section formed by said geometric figure, the center of gravity of said spacecraft lying within said tube.

8. The spacecraft structure according to claim 7 wherein said means for applying at least three spaced forces includes link means coupled to abut said spacecraft at three spaced locations, and drive means coupled to said link means for driving said link means at said three spaced locations in the same direction.

* * * * *